United States Patent [19]

Hagadorn

[11] Patent Number: 4,554,456

[45] Date of Patent: Nov. 19, 1985

[54] SELF-POWERED GAMMA RESPONSES DETECTOR

[75] Inventor: M. Weston Hagadorn, Monroeville, Pa.

[73] Assignee: Westinghouse Electric Corp., Pittsburgh, Pa.

[21] Appl. No.: 408,319

[22] Filed: Aug. 13, 1982

[51] Int. Cl.⁴ ............................................. G01T 1/24
[52] U.S. Cl. ................................................... 250/370
[58] Field of Search ............... 250/370, 371, 390, 391, 250/392

[56] References Cited

U.S. PATENT DOCUMENTS 4,050,961  9/1977  Knight ................................ 141/236
4,237,380 12/1980  Playfoot et al. .................... 250/370
4,389,570  6/1983  Goldstein ........................... 250/370
4,434,370  2/1984  Goldstein et al. .................. 250/370

OTHER PUBLICATIONS

Hansen, "Constitution of Binary Alloys", McGraw-Hill, N.Y., 1958, pp. 405-406.

Primary Examiner—Alfred E. Smith
Assistant Examiner—Carolyn E. Fields
Attorney, Agent, or Firm—W. G. Sutcliff

[57] ABSTRACT

A self-powered gamma-responsive nuclear radiation detector with an emitter electrode of a lead and calcium alloy. The alloy contains calcium in an amount of between 25 and 50 atom percent. This alloy exhibits good ductility with a melting point of at least 630° C.

1 Claim, 2 Drawing Figures

SELF-POWERED GAMMA RESPONSES DETECTOR

BACKGROUND OF THE INVENTION

The present invention relates to self-powered radiation detectors which are typically utilized for in-core nuclear reactor radiation monitoring. The conventional self-powered radiation detector utilizes a central emitter wire, insulating means about the emitter wire, and a coaxially disposed collector sheath about the insulating means. The term self-powered relates to the fact that no electrical potential is required to be applied across the detector electrodes. A signal current is generated as a function of the differing radiation response characteristics of the emitter and collector electrode materials. The emitter material is generally selected as the more radiation-responsive material and can be selected to be a neutron-responsive or gamma-responsive material, based on the particular type of application and reactor.

The emitter material selected for use in self-powered radiation detectors disposed in-core of a nuclear reactor must meet stringent mechanical and nuclear considerations. Some of the properties which are desirable are good mechanical ductility, a high melting temperature, and desirable neutron cross section and/or gamma ray interaction probability. Some of the more widely used emitter materials are rhodium and cobalt for neutron-responsive detectors, and platinum for gamma ray-responsive detectors. A metal which has a very desirable essentially solely gamma radiation response is lead, which however has not found application in such detectors because of the low melting point of lead which is about 327° C.

It has been proposed that a self-powered detector be fabricated utilizing an emitter with an essentially pure gamma-radiation response characteristic in order to avoid the difficulty of interpreting a signal which is the sum of the response to both neutron and gamma radiation. The use of neutron-responsive emitter materials can also give rise to a change in detector signal levels with reactor operating time as a result of excessive burnup of the neutron-responsive material.

It is, therefore, generally desirable to produce a self-powered detector which has essentially a pure gamma response. A prior art attempt to produce a pure gamma-response detector made use of a nickel alloy steel such as Inconel, which is a trademark material of the International Nickel Company, as the emitter electrode with a platinum cladding about the Inconel emitter. This prior art detector produced a lowered neutron response as a result of the platinum cladding without significantly effecting the gamma response of the emitter material. This platinum-clad design, however, still produces a mixed response which is shifted to be more highly gamma responsive. It has been well known that lead exhibits a superior, essentially pure gamma response. However, the low melting point of lead has made it unsuitable for use as an emitter in a self-powered detector for use within a nuclear reactor core because of the high operating temperature within the core. The use of a lead alloy as a self-powered detector emitter material is set forth in U.S. Pat. No. 4,434,370 entitled "Self-Powered Radiation Detector with Improved Emitter", owned by the assignee of the present invention. The lead alloy proposed in the copending application included lead as the major constituent with a minor constituent selected from the group of metals of aluminum, copper, nickel, platinum, or zinc.

SUMMARY OF THE INVENTION

An improved self-powered nuclear radiation detector having essentially solely gamma-response characteristic is provided by fabricating the emitter electrode of an alloy of lead and calcium. The lead and calcium alloy contains between 25 and 50 atom percent calcium and it retains the substantially solely gamma-response characteristic of the lead constituent. With the alloy exhibiting good working ductility and a melting point of at least 630° C.

DESCRIPTION OF THE PREFERRED EMBODIMENTS

Figure 1:
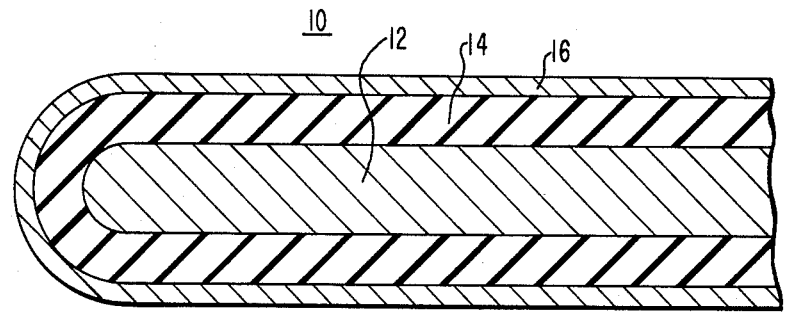
FIG. 1 is a side-elevational view in section of a self-powered detector of the present invention.
Figure 2:
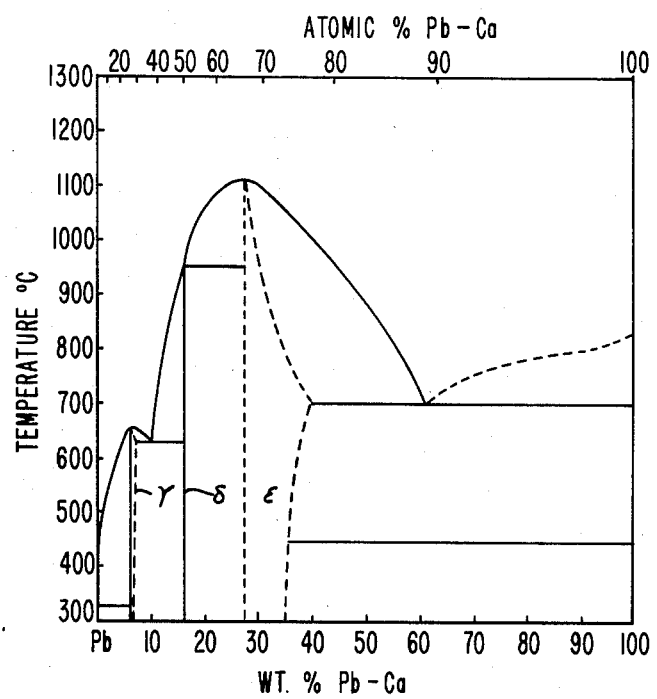
FIG. 2 is a binary phase diagram for alloys of calcium and lead exhibiting the melting points and various phase relationships.

The self-powered detector 10 seen in FIG. 1 comprises a centralized emitter electrode 12, insulating means 14 about the emitter 12, and a conductive collector sheath 16 coaxial about the insulating means 14. Gamma radiation emanating within the reactor core passes through the collector sheath 16, the insulating means 14, and the emitter electrode 12 with differing gamma radiation response for the different materials giving rise to an electrical signal between the electrodes which is a function of the gamma radiation level and the reactor core. In the present invention the emitter electrode 12 is fabricated of a lead-calcium alloy in which the calcium is present in atomic percent of 25 to 50%. The binary phase diagram seen in FIG. 2 exhibits the relative melting points for various alloys and details various phase relationships for the alloy. It can be seen that an alloy containing less than 25 atom percent calcium wuld be unstable and would melt at approximately the melting point of lead at about 327° C. By way of an example an alloy fabricated with 36.5 atom percent calcium has been melted, hot-worked and cold-worked to form an elongated emitter wire electrode. Examination of the binary phase diagram of FIG. 2 shows that the 36.5 atom percent calcium alloy is a eutectic that is a mixture of gamma and delta phases. FIG. 2 is based on information from "Metal Handbook", 8th Edition, Volume 8. This lead-calcium alloy exhibited the desirable mechanical ductility to be readily fabricated into the self-powered detector seen in FIG. 1 and has a melting point which exceeds about 630° C to permit its use within a nuclear reactor core. A self-powered gamma-responsive detector fabricated using such alloy exhibits a substantially solely gamma-response characteristic which makes it a long-lived accurate detector for measuring reactor power levels.

For lead-calcium alloys it is known that the gamma phase has an ordered, face-centered, cubic crystal structure which has good ductility. The delta phase structure is not as well defined but it is believed to be an intermetallic and, therefore, less ductile and perhaps brittle. For this reason it is desirable to maximize the amount of gamma phase in the alloy and minimize the delta phase concentration. The calcium content in the alloy can be varied over the range of about 25 to 50 atom percent calcium to provide the high melting point for the alloy of at least 630° C., while maintaining the desirable substantially solely gamma-response charcteristic.

The insulating means 14 about the emitter 12 is typically a highly compacted refractory oxide, such as aluminum oxide, which is stable at high operating temperatures and which is substantially non-radiation responsive. The collector sheath 16 can be fabricated of a variety of gamma-responsive materials. A typical collector electrode would be a high temperature resistant nickel alloy such as Inconel, which exhibits a gamma response different from the lead-calcium emitter response.

I claim:

1. A self-powered nuclear radiation detector comprising an elongated center wire emitter which exhibits substantially solely gamma radiation response, insulating means disposed about the emitter wire, and a collector electrode coaxial about the emitter and insulating means, which emitter wire consists of an alloy of lead and calcium containing calcium in an amount of between 25 and 50 atom percent, which alloy has a maximized gamma phase and a minimized delta phase whereby the substantially solely gamma-response characteristic is retained, with the alloy exhibiting ductility and a melting point of at least 630° C.

* * * * *